(12) United States Patent
McKewon et al.

(10) Patent No.: US 6,980,908 B2
(45) Date of Patent: Dec. 27, 2005

(54) METHOD OF FORECASTING PRECIPITATION FOR SPECIFIC GEOGRAPHIC LOCATIONS

(75) Inventors: Martin M. McKewon, Rosemount, MN (US); James W. Foerster, Bloomington, MN (US); Travis M. Richardson, II, Minneapolis, MN (US); Douglas P. Chenevert, Lakeville, MN (US)

(73) Assignee: Meteorlogix, LLC, Burnsville, MN (US)

( * ) Notice: Subject to any disclaimer, the term of this patent is extended or adjusted under 35 U.S.C. 154(b) by 106 days.

(21) Appl. No.: 10/814,937

(22) Filed: Mar. 31, 2004

(65) Prior Publication Data

US 2005/0222770 A1 Oct. 6, 2005

(51) Int. Cl.[7] ........................................... G06F 169/00
(52) U.S. Cl. ............................................... 702/3
(58) Field of Search ..................... 702/3, 4; 342/26 R, 342/26 A, 26 D, 460

(56) References Cited

U.S. PATENT DOCUMENTS

| | | | |
|---|---|---|---|
| 4,347,618 A | | 8/1982 | Kavouras et al. |
| 5,255,190 A | | 10/1993 | Sznaider et al. |
| 5,406,481 A | * | 4/1995 | Shinozawa et al. ............ 702/3 |
| 5,717,589 A | * | 2/1998 | Thompson et al. ............ 702/3 |
| 5,839,089 A | * | 11/1998 | Yasuda et al. .................. 702/3 |
| 5,940,776 A | * | 8/1999 | Baron et al. .................... 702/4 |
| 5,959,567 A | * | 9/1999 | Wolfson et al. ........... 342/26 R |
| 5,974,360 A | * | 10/1999 | Otsuka et al. .................. 702/3 |
| 6,125,328 A | * | 9/2000 | Baron et al. .................... 702/3 |
| 6,128,578 A | * | 10/2000 | Sakaino et al. ................ 702/3 |
| 6,163,756 A | * | 12/2000 | Baron et al. .................... 702/3 |
| 6,252,539 B1 | * | 6/2001 | Phillips et al. ............. 342/26 D |
| 6,339,747 B1 | * | 1/2002 | Daly et al. ...................... 702/3 |
| 6,360,172 B1 | * | 3/2002 | Burfeind et al. ............... 702/2 |
| 6,401,039 B1 | * | 6/2002 | Baron et al. .................... 702/3 |
| 6,456,226 B1 | * | 9/2002 | Zheng et al. ............. 342/26 R |
| 6,493,633 B2 | * | 12/2002 | Baron et al. .................... 702/3 |
| 6,501,392 B2 | * | 12/2002 | Gremmert et al. .......... 340/971 |
| 6,542,825 B2 | * | 4/2003 | Jones et al. ..................... 702/3 |
| 6,581,009 B1 | * | 6/2003 | Smith .............................. 702/3 |
| 6,590,529 B2 | * | 7/2003 | Schwoegler ........... 342/357.13 |
| 6,603,405 B2 | * | 8/2003 | Smith .......................... 340/905 |
| 6,650,972 B1 | * | 11/2003 | Robinson et al. .............. 701/3 |
| 6,654,689 B1 | * | 11/2003 | Kelly et al. ..................... 702/3 |
| 6,753,784 B1 | | 6/2004 | Sznaider et al. |
| 6,823,263 B1 | * | 11/2004 | Kelly et al. ..................... 702/3 |
| 6,828,922 B1 | * | 12/2004 | Gremmert et al. .......... 340/949 |
| 6,829,536 B2 | * | 12/2004 | Moore ............................. 702/3 |
| 6,845,324 B2 | * | 1/2005 | Smith .............................. 702/3 |
| 6,915,211 B2 | * | 7/2005 | Kram et al. ..................... 702/5 |
| 6,920,233 B2 | * | 7/2005 | Wolfson et al. ............. 382/100 |
| 2002/0016677 A1 | * | 2/2002 | Baron et al. .................... 702/3 |
| 2003/0025627 A1 | * | 2/2003 | Wilson et al. ................ 342/26 |

\* cited by examiner

*Primary Examiner*—Donald McElheny, Jr.
(74) *Attorney, Agent, or Firm*—Thomas J. Nikolai; Nikolai & Mersereau, P.A.

(57) ABSTRACT

Weather data is collected and used to create a master precipitation steering component grid and a master precipitation grid. These grids are then used to forecast when precipitation will start and stop at one or more identified locations with a geographic area.

10 Claims, 6 Drawing Sheets

METHOD OF FORECASTING PRECIPITATION FOR SPECIFIC GEOGRAPHIC LOCATIONS

BACKGROUND OF THE INVENTION

I. Field of the Invention

The present invention relates to weather forecasting. More particularly, the present invention is directed to a method of calculating and displaying (1) when precipitation will begin at a particular location; (2) when precipitation will end at a particular location; (3) the type of precipitation (rain, snow or sleet) that will fall at a particular location; and (4) the estimated amount of precipitation that will fall at a particular location. The particular location can be a point or any specifically defined area within a broader geographic area.

II. Description of the Related Art

For centuries efforts have been made to make both short term and long term weather forecasts. Given the complexity of weather systems and the numerous variables that exist, accurate, precise and reliable weather forecasting is a goal difficult to achieve on a consistent basis. Most weather forecasts are broad and general in nature. Such forecasts cover broad geographic areas rather than specific locations. Such forecasts also tend to be non-specific as to time. Such forecasts sometimes are imprecise as to the nature of precipitation that might fall. Such forecasts also typically give broad ranges related to the quantity of precipitation to fall rather than a predicted measurement. Prior art forecasting techniques have simply been unable to account for the myriad of factors to a sufficient degree to provide more specific forecasting either with respect to the time or location where particular specific weather phenomena will occur.

There has been one general exception to this rule in recent years. Since the late 1980's and early 1990's computers, in combination with weather radar, have been used to track storm cells and predict their movement over short periods of time, e.g. where the centroid of the storm will be in 15–30 minutes. Weather radar scans have been successfully used to identify the centroid of a highly developed storm cell, monitor the speed and direction of movement of the storm cell's centroid over time, and then extrapolate from the location, speed and direction data where the storm will be in the near term. Currently, the NEXRAD system creates and distributes a combined attribute table for storm cells detected by radar. A separate table is distributed for each radar. The table includes information related to the location of the cell and its speed and direction. This data can be used to calculate the arrival time of the cell at a particular location.

The techniques currently used to track storms will not, however, successfully predict the start and end times of precipitation at a particular location for a variety of reasons. First, storm tracking algorithms depend on the identification of a storm cell. Precipitation can begin well before and end well after the primary storm cell passes over a location. Further, storm tracking techniques simply will not work with less developed, weaker areas of precipitation not classified as storms by the NEXRAD algorithms. These areas of precipitation include lighter showers and areas of general rain, sleet or snow. These non-storm events have a substantial impact on business commerce. Movement of these areas of precipitation is also affected materially by a larger number of variables than intense storms. Also, the algorithms used to track storms do not provide information such as location-based start times, end times, and quantity.

Traditional color weather radar displays have been commonplace for decades. They are now readily available from private weather vendors, the National Weather Service and other third party data distributors. Since weather radar updates are available from the National Weather Service NEXRAD sites across the United States as frequently as every 5 minutes, users typically have the ability to display the current radar image as well as images from the past hour which gives the user some concept of the overall movement of a precipitation area.

While comparing radar scans over a period of time might provide a general idea of the direction the precipitation area is moving from, there is no information provided as to how fast the areas of precipitation are moving. As such, users have only been able to crudely estimate or calculate these factors related to precipitation. Additionally, due to the complex meteorological factors inherent in predicting precipitation patterns, there is no guarantee that an area of precipitation will continue to move in the same direction in the future that it has been moving in the past. Too many environmental conditions affect such movement.

Prior art methods exist that attempt to provide an arrival time of a precipitation area, but these methods all depend on a basic measurement of how far an area of precipitation has moved in a previous given amount of time and then extrapolating this out into the future, assuming nothing is going to change. Such methods include the use of a crudely made scale-out of paper representing a ruler, writing on a screen with grease pencil, or using other various inaccurate methods such as using a mouse to draw on the screen with the length of the line representing a distance, then extrapolating this out into the future with little, if any, true accuracy, and certainly no scientific basis. Given the crudeness inherent in such prior art techniques, predictions made using such techniques can result in huge errors for obvious reasons. Without true knowledge of how the atmosphere is affecting the precipitation area, any estimates are crude at best and will yield varying results. Such crude extrapolations will also result in rapidly increasing errors as predictions are made as to what will happen further out in time. Prior art techniques simply cannot be used to accurately predict what will be occurring one or more hours into the future.

Still other complicating factors exist in trying to employ such prior art tracking methods. Radars often falsely detect precipitation or other anomalous propagations. These false echoes may be interpreted as real by the novice thereby causing calculations to be performed on precipitation that is not real.

Heretofore, efforts to estimate the amount of precipitation that is going to fall with any accuracy at a particular location has proven to be even more difficult, if not impossible. While the NEXRAD radar system provides the ability to indicate how much rain has fallen in the past hour or past three hours at a location, such products really provide no predictive capability in attempting to estimate how much rain will fall in a given area when the precipitation moves over that area. Too many factors affecting movement of weather patterns exist to provide an accurate prediction.

Weather conditions can have a significant impact on many businesses and on the economy as a whole. While it is not possible to control the weather, many businesses could take advantage of accurate, location-based weather forecasts by scheduling business activities around weather events. Many businesses would benefit from the ability to predict the start time of precipitation, the end time of precipitation, and the quantity of precipitation more accurately. For example, golf courses can provide patrons with an end time of the rain allowing golfers to wait out the storm vs. leaving the course, thereby maximizing profitability of the operation. Similarly, construction companies having an accurate prediction of when rain, sleet or snow would be occurring at a particular jobsite could schedule the pouring of concrete or other construction activities affected by weather accordingly. These are just two examples of how an accurate prediction of the start and stop times of precipitation and the quantity of precipitation at a particular geographic location could be highly beneficial.

In view of the foregoing, there is a real need for a system that is capable of accurately predicting the start and stop times of precipitation. It is, therefore, an object of the present invention to provide a method for making such an accurate prediction.

A further object of this invention is to provide a method and system for accurately predicting the quantity of precipitation at a particular location.

Still another object of the invention is to provide a system by which start time, stop time and quantity of precipitation can be delivered in a useful and timely fashion.

A further object of the invention is to provide a system that provides information related to the nature of the precipitation, i.e. rain, sleet or snow.

SUMMARY OF THE INVENTION

DETAILED DESCRIPTION OF A PREFERRED EMBODIMENT

The present invention contemplates the use of a computer to gather and process the data necessary to make precipitation predictions.

Various types of weather data from various sources must be gathered, processed and analyzed to provide an end user with information related to the arrival and end times of precipitation, the nature of precipitation, and the quantity of precipitation for one or more particular locations.

Figure 1:
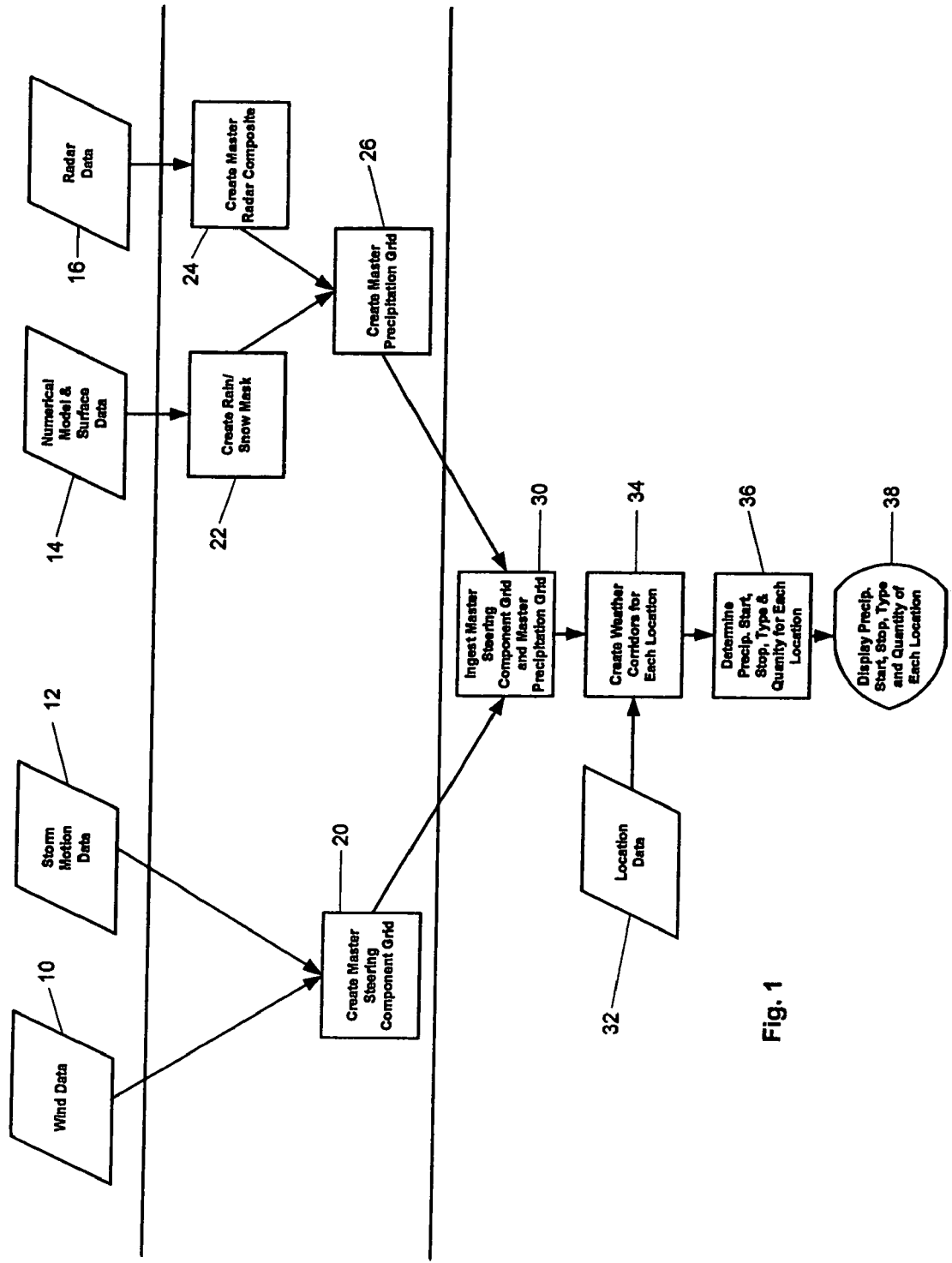
FIG. 1 is a flow chart showing the operation of a first embodiment of the present invention.
Figure 2:
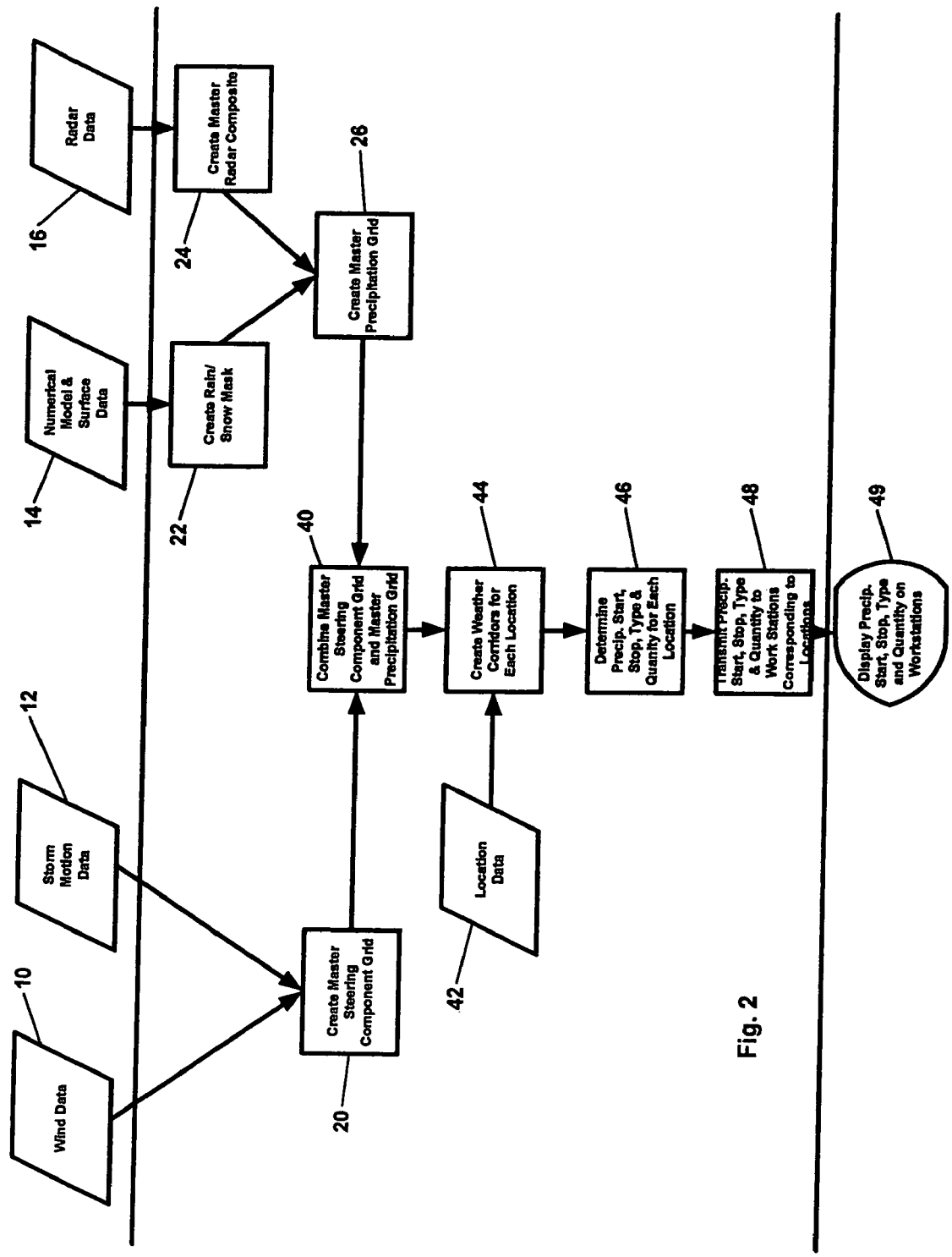
FIG. 2 is a flow chart showing a second embodiment of the present invention.
Figure 3:
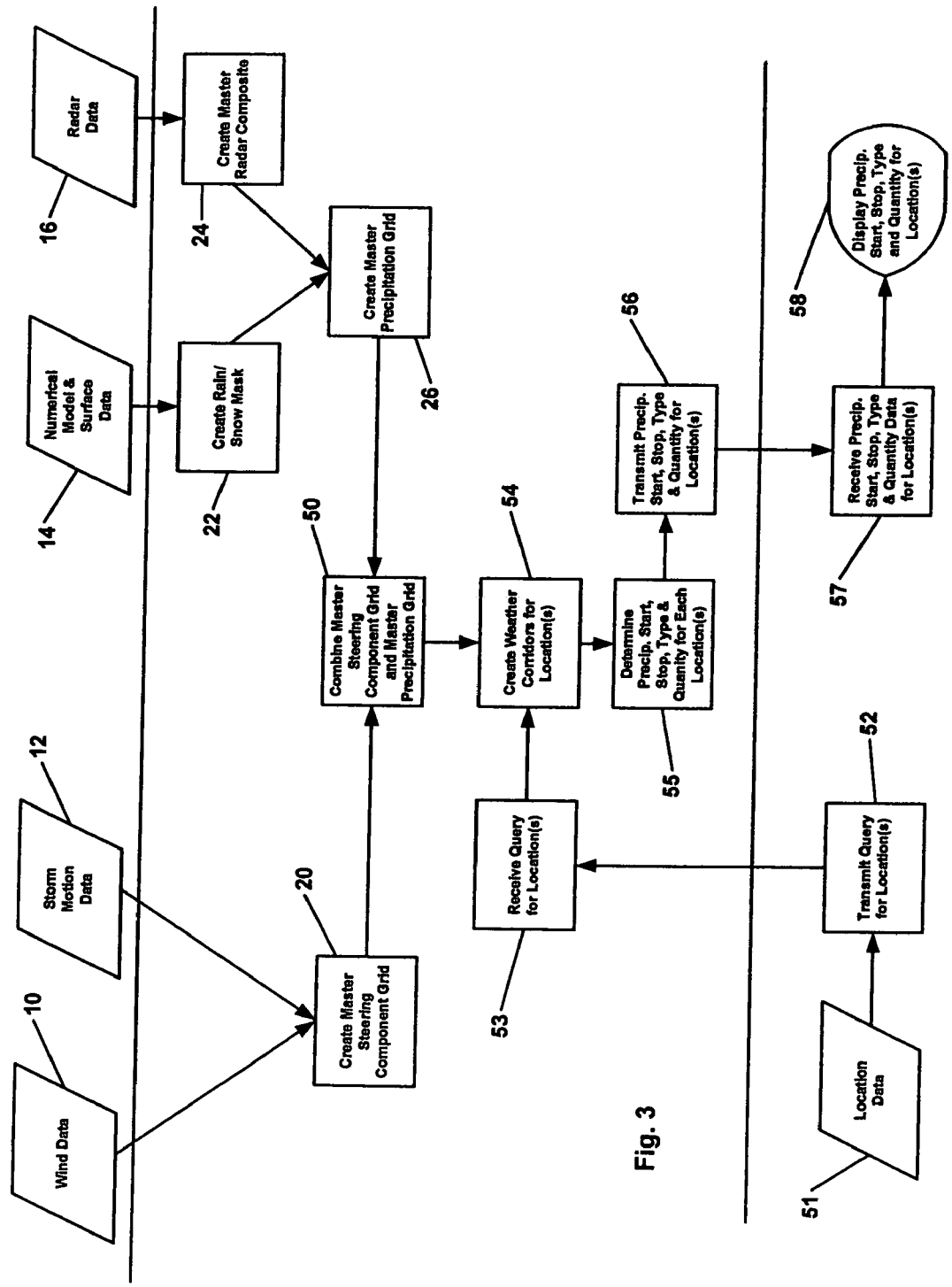
FIG. 3 is a flow chart sowing a third embodiment of the present invention.

As shown in FIGS. 1–3, four different types of weather data are collected. The four types of weather data include wind data 10, storm motion data 12, numerical model and surface data 14 and radar data 16. Such data can be collected and stored in one or more databases accessible by a computer for processing. Typically, separate databases will be used to store wind and precipitation data. The wind data 10 can be of the type provided by the National Centers for Environmental Prediction or any of a variety of other suppliers of weather data. The storm motion data can be of the type provided in the combined attribute tables generated and distributed by government for each of the radar installations that make up the NEXRAD system. Data from other radar systems could be used as well. Alternatively, other data indicative of storm motion could be collected and processed to derive motion vectors. The numerical model and surface data 14 is collected from approximately 4500 weather stations spread throughout the United States. Such surface data may include temperature, dew point and pressure data. Alternatively, surface data could be derived using computer modeling. The radar data 16 also comes from the network of NEXRAD radars operated by the government and spread across the continental United States. Such data could also be collected from other radars and sources.

FIGS. 1–3 also show that the wind data 10 and storm motion data 12 are used to create a master steering component grid 20. While storm motion data can be a good predictor of precipitation movement, such data can be limited due to the need for convective elements. Thus, this data is not always available. A more comprehensive and sometimes more accurate forecast can be created by combining this data with the wind data 10. The wind data 10 provides the speed and direction of the wind 10 at various atmospheric levels. The storm motion data 12 and wind data 10 from various sources are received by a computer and then processed by the computer to create a master steering component grid 20. The master steering component grid is made up of defined points across the geographic area. Each point on the grid is assigned a precipitation steering component based upon an averaging of the forecast direction and speed of the winds at that location at one or more levels of the atmosphere responsible for steering precipitation.

To create the master steering component grid 20, a number of factors are taken into account. The three primary factors are seasonality, wind speed and direction at different altitudes, and storm motion data when available. In taking seasonality into account, the algorithm used to create the master steering component grid 20 places greater emphasis on winds at different elevations at different times of the year.

The system of the present invention not only takes the speed and direction of winds into account in creating the master steering component grid, but also adjusts which winds are emphasized in calculating wind speed and direction when creating the master steering component grid based upon a seasonality factor that takes into account changes that occur throughout the year in the levels of the atmosphere responsible for steering precipitation. This determination can be checked and adjusted based upon actual movements of precipitation over time and combined with storm motion data. Thus, creating the master steering component grid 20 involves capturing and formatting wind data 10 and storm motion data 12, processing that data to determine what winds at what levels of the atmosphere are responsible for steering precipitation, and then creating the master steering component grid that defines points by latitude and longitude across the continent and assigns to each point on the master grid a precipitation steering component reflecting the speed and direction of the steering winds at that point on the continent. The master steering component grid is not a static forecast. Instead, it is a forecast that is updated periodically throughout the day as the wind data 10 and storm motion data 12 changes.

As indicated above, other weather data is also gathered and processed by the computer. The numerical model and surface data 14 is used by the computer to create a rain/snow mask 22 for the continental United States. This mask 22 is used to determine the nature of precipitation, if any, that will fall at particular geographic locations given the temperature, dew point and atmospheric pressure at such locations.

The radar data 16 is collected in real time from each NEXRAD radar site and potentially other radars. Such radar data might include, for example, the base reflectivity data provided by the NEXRAD system. The radar data 16 is processed by the computer to create a master radar composite 24. The radar data 16 is continuously received by the computer, time synchronized into five minute or sooner intervals, and subjected to several quality control steps in creating the master radar composite 24. These quality control steps are designed to remove ground clutter and anomalous propagation from the raw radar data 16. These steps ensure that only real radar echoes are used to calculate precipitation start and end times and determine quantities of precipitation that might fall. The master radar composite 24 is recreated every five minutes or sooner with the new data received.

Figure 4:
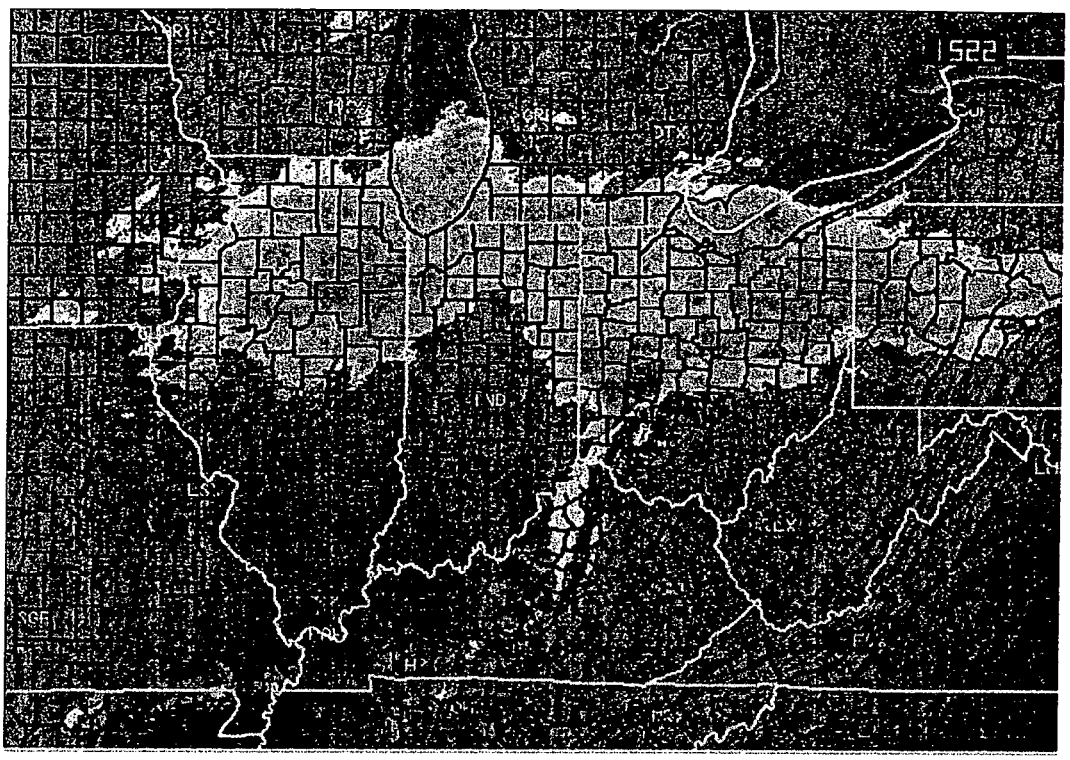
FIG. 4 is an example of a radar image that has been subjected to a quality control process.

Using the rain/snow mask 22 and the master radar composite 24, the computer then generates a master precipitation grid 26. A representation of the master precipitation grid 26 can be displayed on the monitor of a computer. FIG. 4 is an example of what such a representation would look like.

To this point, the three embodiments shown in FIG. 1–3 are essentially the same. What happens next will depend, however, on which embodiment is used.

In the embodiment of FIG. 1, both the master steering component grid 20 and the master precipitation grid 26 are transmitted to a user's workstation and ingested by the user's workstation at step 30. The workstation used in this embodiment would typically be a personal computer. However, other types of workstations could also be used. As a result, the user's workstation knows from the master precipitation grid each area of precipitation detected by radar, the intensity of such precipitation and the nature of such precipitation. From the master steering component grid, the user's workstation also knows the speed and direction in which all areas of precipitation are moving.

Figure 5:
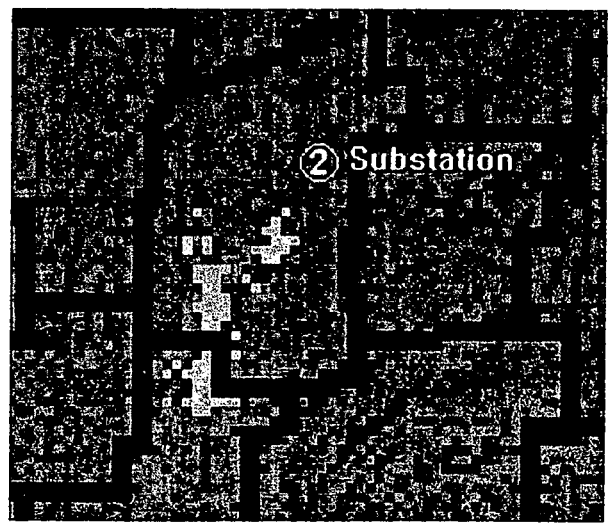
FIG. 5 is an example of a radar image which has been modified to show a specific location and a name assigned to that location.

For the user's workstation to make precipitation predictions related to a particular location, the location must be defined for the workstation. Location data 32 includes a unique identifier for each location. If the location is a point, the location data 32 includes the latitude and longitude of the point. If the location is an area, the location data 32 includes the latitude and longitude of the points that define the area. If the user knows the latitude and longitude information for a location of interest, this information can be supplied directly. Alternatively, a map can be displayed by the workstation and the user simply uses a mouse to point and click on the desired location or draw a shape defining the location. The workstation uses such entries to determine and record the latitude and longitude of the point or area on the map selected by the user. The user can also separately name each of the locations to be monitored. FIG. 5 provides an example of a map showing the name and location of a specific location to be monitored.

All of the data collection and processing as described above is, of course, a precursor to the step of actually making a precipitation prediction for the particular locations selected. Such a prediction would not be possible for the workstation to make without the master steering component grid, the master precipitation grid and the user defined locations.

Figure 6:
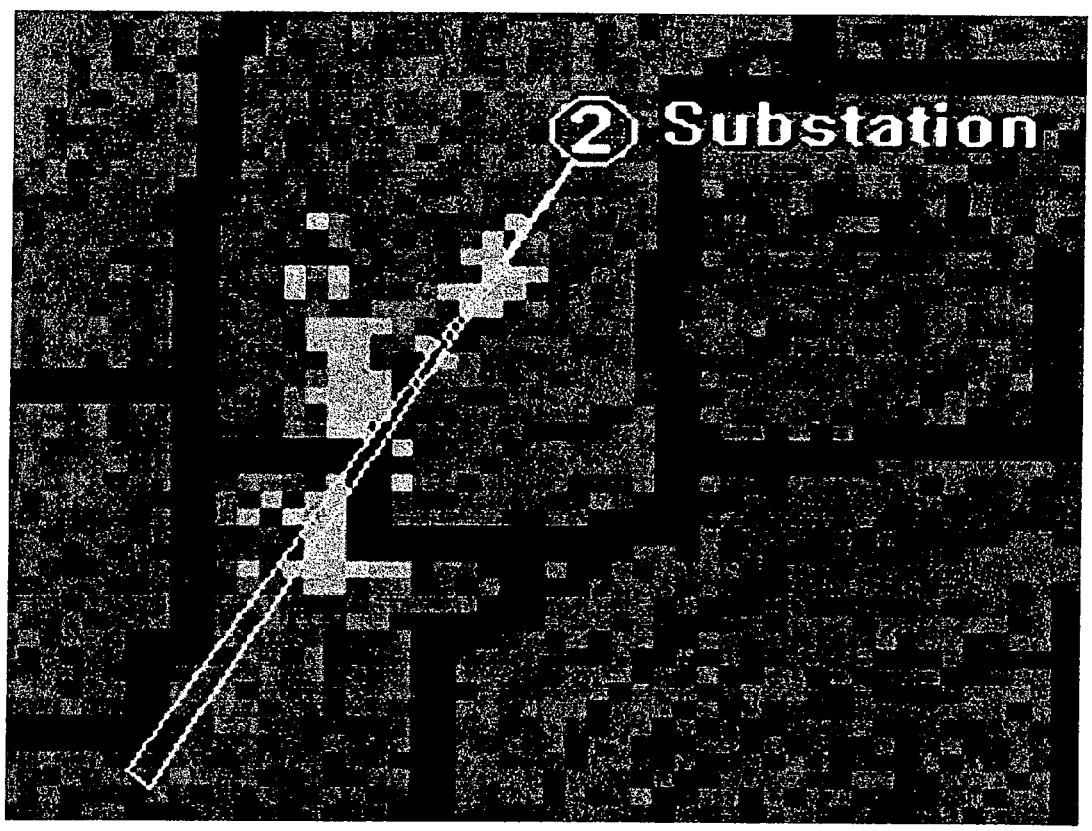
FIG. 6 is the radar image of FIG. 3 to which a visual representation precipitation corridor has been added.

To make such a forecast, the workstation looks "upstream" or into the steering wind from each specific location identified and creates a weather corridor 34 for each location. This gives the user's workstation a look into the future. FIG. 6 graphically represents this look made by the workstation. Each corridor 34 extends from the location to be monitored into the steering wind. The length of the corridor is a function of the speed of the steering wind (i.e., the mean value of the wind fields) and the length of time the computer is looking into the future. The width of the corridor is defined to prevent precipitation that will not impact the defined location from falling within the corridor. The user's workstation assumes that precipitation detected within the corridor will impact the specific location.

The corridors 34 act as detection beams. The NEXRAD weather radar system is sampling the atmosphere every 5 minutes or sooner. Likewise, the master precipitation grid 26 is updated and transferred to the user's workstation every five minutes or sooner. At step 36, the user's workstation determines whether any actual echoes fall within the corridor. Actual echoes detected within the corridor are processed further to ensure the precipitation is real and significant. Once it is determined that real and significant participation is present within the corridor, time and distance calculations occur. These calculations define the following: location of precipitation, speed of precipitation, direction of precipitation movement, type of precipitation, arrival time of precipitation and end time of precipitation. These calculations are performed each time the user's computer receives a new master precipitation grid 26 to ensure accuracy and reliability.

Another calculation is also performed. Specifically, reflectivity returns within the corridor are analyzed to derive a number representing the average rate of precipitation within the corridor. This average, thus, provides a prediction of how much precipitation could fall at the specified location.

Those skilled in the art will appreciate that start and stop times for precipitation are dependent on how far upstream the corridor is looking. This time can vary from minutes to hours.

At 38, the user's workstation displays the forecasted start time of precipitation for a location, the forecast stop time for the precipitation, the type of precipitation (rain, snow or mixed) and the estimated amount forecast.

The alternative embodiments shown in FIGS. 2 and 3 are advantageous when the user desires to receive and display the forecast information on a workstation other than a desktop or laptop computer. Such a workstation could be a cell phone, personal digital assistant or any other display device having logic that permits it to communicate with the main computer and display information transmitted to the workstation by the main computer. Such devices, as well as any user computer, are collectively referred to herein as workstations.

FIG. 2 shows the present invention being used as a subscription service. Rather than transmitting the master steering component grid 20 and the master precipitation grid 26 created on the main computer to the user's workstation, they are combined in the main computer at step 40. As part of the subscription process, location data 42 is supplied to the main computer. In this embodiment, such location data includes the address (e.g., e-mail address or telephone number) of at least one workstation associated with each particular location in addition to a location identifier and the latitude and longitude for each location. At step 44, the main computer creates a weather corridor for each location. At step 46, the main computer determines whether precipitation exists within the corridor created for any location and, if so, predicts the precipitation start and stop times, the type of precipitation and the quantity expected at the particular location. At step 48, this forecast information is transmitted to the workstation associated with the location. At step 49, the workstation displays the start time, stop time, type and quantity of precipitation forecast for the particular location.

While the display of information by the workstation will typically be a visual representation, either a text message or a graphic, the user workstation can also audibly provide this information to the user. The term display is intended to be generic of all forms of delivery of a message containing the forecast whether visual, audible or otherwise.

FIG. 3 shows the present invention implemented so that the user can query the main computer from a workstation to obtain forecast information for a desired location. This embodiment of the invention is particularly advantageous if the user wants forecast information for the user's then current location or some other location that the user will be traveling to. As described above, the location information can be provided by entering a known latitude and longitude or by clicking on a computer generated map so that the computer can determine the latitude and longitude for the location. The location information can also be provided through the use of global positioning system technology or cellular technology or any other technology that allows the workstation to determine and transmit location information.

When the embodiment shown in FIG. 3 is implemented, the master precipitation grid 26 and the master steering component grid 20 are combined on the main computer at step 50. Location data is collected at step 51 by the workstation using any of the techniques described above or any other suitable technique. At step 52, a query containing location information is transmitted by the user's workstation to the main computer. The main computer receives the query at step 53. The query preferable includes the identity of each particular location of interest, latitude and longitude information for that location, and the address of the workstation to receive forecast information related to the location. The workstation receiving the forecast information will typically be the same device that transmitted the query, but this is not necessarily the case.

At step 54, the main computer establishes a corridor for each location to be monitored based upon information contained in the master steering component grid 20. At step 55, the main computer uses the information in the master precipitation grid 26 to determine whether precipitation is present in a corridor for a particular location and, if so, the start time, stop time, type and quantity of precipitation at that particular location. At step 56, this information is transmitted by the main computer to the specific workstation intended to receive such information. This information is received by the workstation at step 57 and displayed at step 58.

The present invention has proven to be very accurate under most conditions. However, conditions may exist that make the method of the present invention less accurate. For example, there will be parts of the country on any given day where the winds in the atmosphere are too light to steer precipitation in a predictable manner. In these cases, precipitation is steered by micro-scale meteorological events such as sea breezes, the topography of the region, or interaction from nearby storms. When winds are too light to steer precipitation, the computer transmits a message to the user informing the user that the winds are too light for an accurate prediction. Thus, the computer itself performs certain quality checks and informs the user when a reliable prediction cannot be made.

Figure 7:
FIG. 7 is a display showing the predicted start and stop times for rain at three specified locations as well as an indication of the quantity of rain likely to fall at each location.
Figure 8:
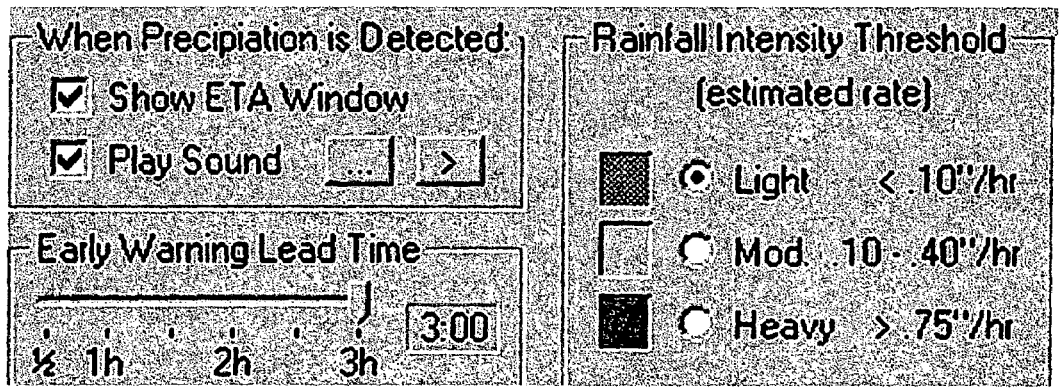
FIG. 8 shows an example of a data entry screen that allows a user to modify the information to be displayed in a user's workstation.

The system of the present invention provides multiple methods to display the predicted information to the user. One example is for the workstation to indicate on the display the arrival and end times of the precipitation at a location. For example, FIG. 7 shows a small window that can pop up on the workstation's display. FIG. 8 provides information with respect to three specific locations—(1) Dakota Country Club; (2) Stone Creek Golf Club; and (3) Benson Golf Course. The display indicates that the system has determined that rain at Dakota Country Club will begin at 11:26 a.m. and end at 1:06 p.m., rain presently occurring at Stone Creek will end at 12:43 p.m., and rain at Benson Golf Course will begin at 12:40 p.m. and will last longer than the three hour time window selected by the user. The colored boxes in the window provides an indication of the intensity of rain. The user can access information that assigns quantities to these intensities. For example, green could mean less than 0.10 inches per hour. Yellow could mean 0.10 to 0.50 inches per hour, and red could mean more than 0.75 inches per hour. The information is updated regularly as new data is received by the computer. Also, audible alerts can be assigned to the detection of precipitation.

FIG. 8 is provided to show how a user can modify the messages associated with a location. The user can decide whether a window like that shown in FIG. 7 should be displayed, whether a sound should accompany the message as a further alert, and can set the lead time for the alert to between ½ hour and 3 hours or more. The user can also decide how much rain will trigger a message by selecting between the three options on the right side.

While FIG. 7 shows a window that can appear on a display of a workstation that is a personal computer, such information can also be conveyed wirelessly to other types of workstations such as a personal digital assistant, cell phone, alphanumeric pager or any other device capable of receiving SMS messages. The message can be a simple text or audio message indicating start and stop times. When transmitted to a device with a suitable display, the message can be accompanied by a graphic including a map and visual image of the weather conditions detected by radar and the corridor affecting the specific location. The user can define not only the locations of interest to the user, but also the nature and content of the messages the user will receive.

The description provided above is intended not only to meet the disclosure requirements of the patent laws, but also to convey the advantages and versatility of the present invention. The present invention has application to any business having operations affected by precipitation. Farmers would find such information useful when applying fertilizers, herbicides or pesticides or otherwise planning their work. Construction companies would find such information useful when pouring concrete or excavating. The present invention is also useful to recreational enterprises dependent on the weather including golf course, community swimming pools, community park and recreation departments, athletic associations, fairs, carnivals, and the like. Even individuals would find such information useful in planning parties, family picnics, or other family activities.

The description provided above is not intended to be limited. The scope of the invention is instead defined only by the following claims.

What is claimed is:

1. A method for electronically processing weather data to predict and display when precipitation will start and stop at a location within a geographic area comprising:
   a. creating and storing a master steering component grid defining point locations across said geographic area with each point location being assigned a precipitation steering component, said precipitation steering component being based upon either storm motion data or wind speed and direction data at various levels of the atmosphere or both storm motion data and wind speed and direction data at various levels of the atmosphere;
   b. creating and storing a master precipitation grid based upon data received from a weather radar network, such data being processed to remove false echoes and ground clutter from data received from individual radar sites and other data, said master precipitation grid indicating the location and type of precipitation;
   c. identifying and storing the latitude and longitude information for a particular location with a geographic area;
   d. using the master steering component grid to create and store a weather corridor for the particular location, said weather corridor extending from the particular location in the opposite direction of the steering component for the particular location, the length of the corridor being proportional to a value representative of the wind speed portion of the steering component over a specified time period for the particular location, the width of the corridor being defined to permit detection of precipitation that will impact the particular location and prevent detection of precipitation that will not impact the particular location;
   e. using the weather corridor and the master precipitation grid to determine whether precipitation exists within the corridor and, if so, predicting the start and end time of precipitation at the particular location based upon the forecast speed and direction of movement of precipitation within the corridor; and
   f. displaying said predicted start and end times on a display.

2. The method of claim 1 further including the step of indicating on the display the precipitation type.

3. The method of claim 1 wherein said precipitation steering component is also based upon a seasonality factor which takes into account changes that occur throughout the year in the levels of the atmosphere responsible for steering precipitation.

4. The method of claim 1 further including the step of indicating on the display the quantity of precipitation predicted to fall at said location.

5. A method of predicting for each of a plurality of predetermined locations within a geographic area whether precipitation will fall, the time said precipitation will start to fall, and the time said precipitation will stop falling, comprising:
   a. storing in a computer-accessible location database (i) the identity of each of a plurality of predetermined locations within a geographic area, and (ii) latitude and longitude information for each of said predetermined locations;
   b. creating and storing in a computer accessible steering wind database, data from at least one source related to the speed and direction of wind at various levels in the atmosphere;
   c. creating and storing storm motion data in a computer-accessible storm motion database;
   d. storing in a computer accessible precipitation database, data received from at least one source related to the location and type of precipitation within said geographic area;
   e. creating and storing a master steering component grid based upon either data stored in said steering wind database or said storm motion database or in both said steering wind database and said storm motion database, said master steering component grid including defined points across said geographic area and for each defined point a precipitation steering component, said precipitation steering component based upon storm motion data, the forecast wind speed and direction at various levels of the atmosphere and a selection of at least one level of the atmosphere responsible for steering precipitation;
   f. creating and storing a master precipitation grid based upon data in said precipitation database;
   g. creating and storing a weather corridor for each of said predetermined locations within the geographic area;
   h. comparing the weather corridor for each of said predetermined locations with said master precipitation grid to determine if precipitation is falling within said corridor; and
   i. if precipitation is falling within said corridor, predicting the start and end times of said precipitation at the particular location associated with said corridor.

6. A method for electronically processing weather data using a primary computer and a workstation to predict and display when precipitation will start and stop at a location with a geographic area comprising:
   a. collecting steering wind data, storm motion data, numerical model and surface data and base radar data for said geographic area;
   b. creating (i) a master steering component grid for the geographic area based upon said steering wind data, the master steering component grid defining points across the geographic area and for each such point the calculated speed and direction of the wind responsible for steering precipitation; and (ii) a master precipitation grid for the geographic area based upon said radar data and said numerical model and surface data, said master precipitation grid identifying the location of areas of precipitation in the geographic area and the type of precipitation in each area of precipitation;
   c. supplying location data comprising the identity of a location within the geographic area and latitude and longitude information for said location;
   d. using said location data and said master steering component grid to define a weather corridor for the location;
   e. using said master precipitation grid to determine whether precipitation exists within said weather corridor;
   f. using said master steering component grid to determine when any precipitation within said corridor will start and stop at the location; and
   g. displaying when the precipitation will start and stop at the location.

7. The method of claim 6 wherein steps a and b are performed by the primary computer and steps c–g are performed by the workstation.

8. The method of claim 6 when steps a–f are performed by the primary computer and step g is performed by the workstation.

9. The method of claim 6 wherein the workstation supplies said location data to the first computer and displays when precipitation will start and stop at the location.

10. A method for electronically processing weather information to predict and display when precipitation will start and stop at at least one particular location within a geographic area comprising:

a. identifying and storing the latitude and longitude of at least one particular location within a geographic area;

b. creating and storing a master precipitation grid based upon data received from a radar network;

c. collecting and storing data related to weather conditions that will affect the movement of precipitation in the geographic area covered by the master precipitation grid;

d. creating and storing a projection of the future movement of precipitation based upon said data related to weather conditions that affect the movement of precipitation;

e. determining the times when precipitation will start and stop at said at least one particular location using said stored latitude and longitude for said location, said master precipitation grid, and said projection of the future movement of precipitation over time, and f. displaying said times.

* * * * *

UNITED STATES PATENT AND TRADEMARK OFFICE
CERTIFICATE OF CORRECTION

PATENT NO.    : 6,980,908 B2
DATED         : December 27, 2005
INVENTOR(S)   : Martin M. McKewon et al.

It is certified that error appears in the above-identified patent and that said Letters Patent is hereby corrected as shown below:

Column 9,
Line 20, "with" should read -- within --.

Column 10,
Line 34, "with" should read -- within --.

Signed and Sealed this

Twenty-first Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,980,908 B2
DATED : December 27, 2005
INVENTOR(S) : Martin M. McKewon et al.

It is certified that error appears in the above-identified patent and that said Letters Patent is hereby corrected as shown below:

Column 9,
Line 20, "with" should read -- within --.

Column 10,
Line 34, "with" should read -- within --.

Signed and Sealed this

Twenty-first Day of March, 2006

JON W. DUDAS
*Director of the United States Patent and Trademark Office*